Patented June 15, 1937

UNITED STATES PATENT OFFICE 2,083,870

PREPARATION OF SODIUM HYDROSULPHITE

Norman D. Scott, Joseph Frederic Walker, and Virgil L. Hansley, Niagara Falls, N. Y., assignors to E. I. du Pont de Nemours & Company, Wilmington, Del., a corporation of Delaware Application May 25, 1935, Serial No. 23,522

16 Claims. (Cl. 23—116)

This invention relates to the manufacture of alkali metal hydrosulphite by the direct reduction of sulphur dioxide or an alkyl sulphite with an alkali metal.

Heretofore, sodium hydrosulphite has been prepared almost exclusively by reducing sodium bisulphite solutions with zinc, treating the zinc salt with sodium carbonate, filtering out zinc carbonate and recovering sodium hydrosulphite from the filtrate. The number of steps involved in this procedure and the instability of solutions of sodium hydrosulphite have led to attempts to make sodium hydrosulphite from sodium and $SO_2$, which should theoretically give this as a sole product, in accordance with the equation $$2Na + 2SO_2 \rightarrow Na_2S_2O_4$$

The nearest that any of these efforts have come toward giving a practical process have been by the use of dilute sodium amalgam and solutions of $SO_2$ in alcohol. Here, however, the difficulty of separating the sodium hydrosulphite from the mercury sufficiently rapidly and completely has prevented the process from being adopted for commercial use.

An object of this invention is to provide an improved method for producing alkali metal hydrosulphite. A further object to to provide a method whereby sulphur dioxide may be reduced directly by means of an alkali metal compound to produce the corresponding hydrosulphite. Other objects will be apparent from the following description of the invention.

Figure 1:
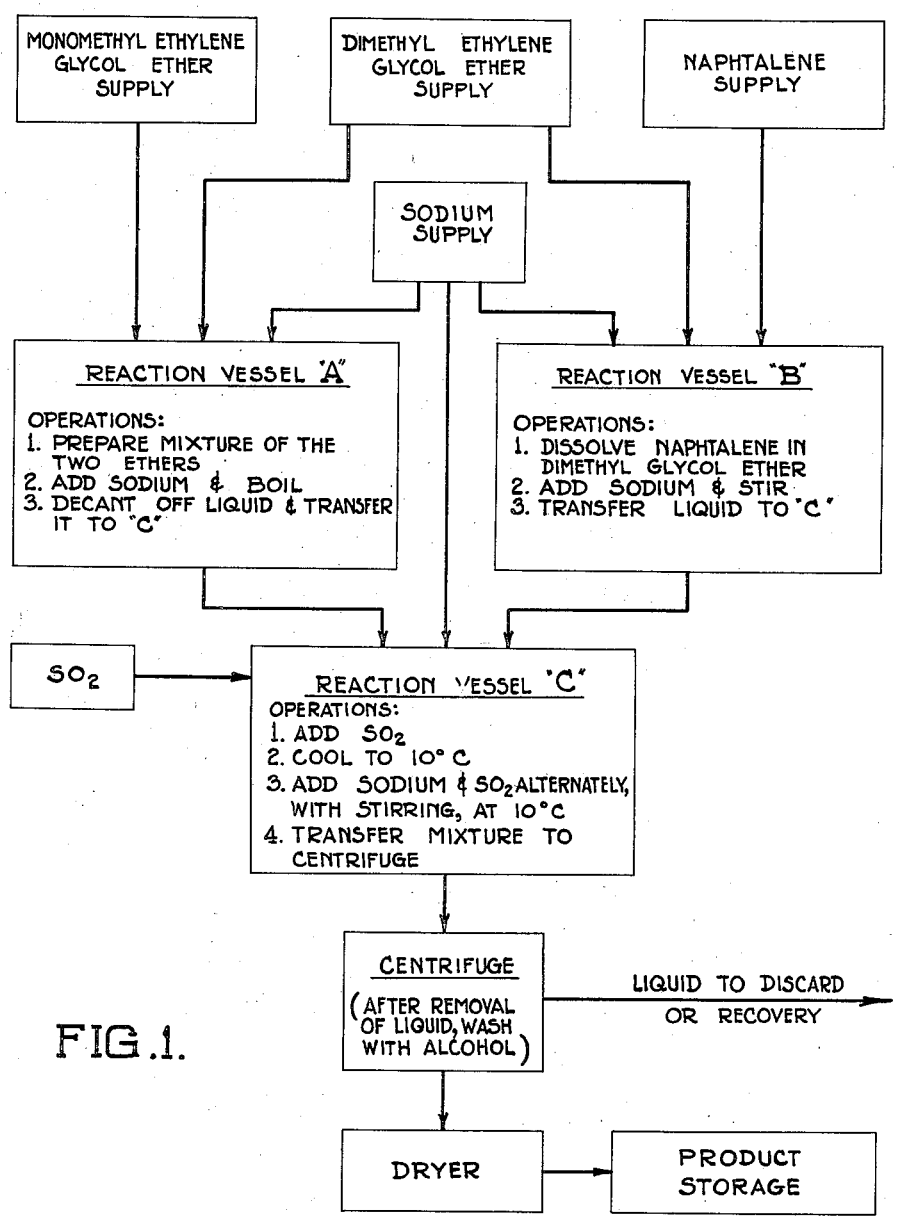

The appended drawings are flow sheets illustrating two modifications of the present invention which are described below in Examples 2 and 3. Referring to Figure 1, monomethyl ethyl glycol ether is mixed with dimethyl ethyl glycol ether in reaction vessel "A" and sodium is added to the mixture which then is heated to the boiling point to form the sodium alcoholate of monomethyl ethyl glycol ether. The resulting sodium alcoholate solution is transferred to reaction vessel "C". In reaction vessel "B", naphthalene is dissolved in dimethyl ethyl glycol ether and sodium is reacted therewith to form a solution of the sodium addition compound. This solution likewise is transferred to reaction vessel "C". The resulting dimethyl ethylene glycol ether solution of the alcoholate and of the sodium addition compound of naphthalene is treated in vessel "C" alternately with sodium and sulphur dioxide, whereupon a precipitate of sodium hydrosulphite is formed. The mixture then is transferred to a centrifuge, wherein the precipitate is removed from the liquid and washed with anhydrous alcohol. The washed precipitate then is dried to complete the process.

Figure 2:
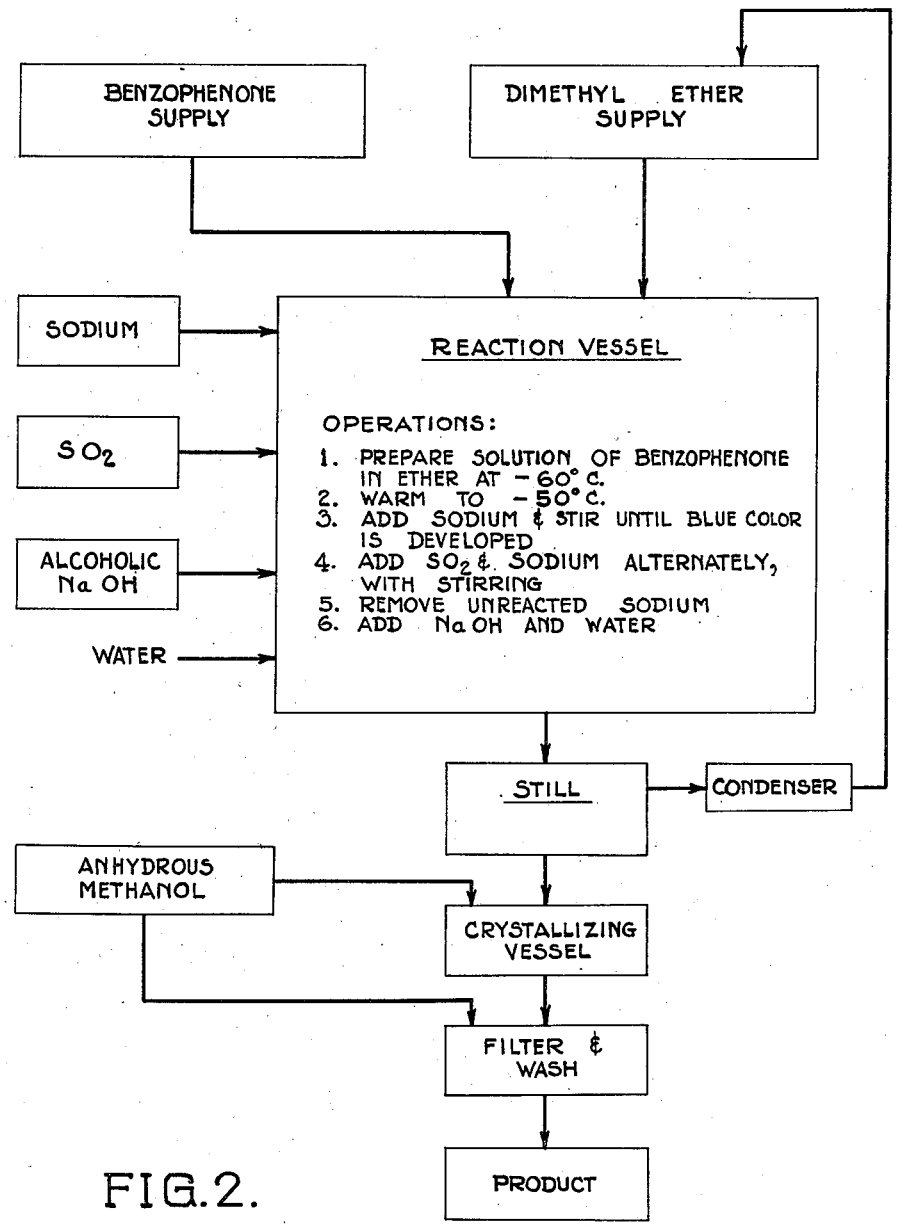

Referring to Figure 2, benzophenone is dissolved in dimethyl ether in a reaction vessel and this solution is treated alternately with sodium and sulphur dioxide to form sodium hydrosulphite. The reaction mixture then is made alkaline with an alcoholic solution of sodium hydroxide and sufficient water is added to dissolve the sodium hydrosulphite formed. The mixture then is distilled to recover the solvent and the aqueous residue is transferred to a crystallizing vessel where anhydrous methanol is added to precipitate crystallized sodium hydrosulphite. The precipitate then is filtered and washed with anhydrous methanol.

We have discovered that alkali metal hydrosulphite may be made in an advantageous manner and in better yields than has been heretofore possible by utilizing as the reducing agent alkali metal in the form of addition compounds made by reacting alkali metals with aromatic organic compounds. In accordance with the preferred embodiment of our invention this reaction may be carried out advantageously in such manner that the addition compound is formed in the reaction mixture simultaneously with its reaction with sulphur dioxide or an alkyl sulphite to produce the alkali metal hydrosulphite. Various organic compounds which react with alkali metals without hydrogen evolution to form addition compounds may be used in our invention. Examples of such organic compounds are the polycyclic aromatic hydrocarbons such as naphthalene, diphenyl, phenanthrene, anthracene and acenaphthene and aromatic carbonyl compounds in which there is no hydrogen atom attached to a carbon atom adjacent to the carbonyl group, such as anthraquinone, diaryl ketones, e. g. benzophenone, esters of aromatic acids, e. g. alkyl benzoates, benzyl and phenyl benzoates or various derivatives of the above named compounds, e. g., their alkyl derivatives. Also aliphatic ketones having two tertiary alkyl groups adjacent to the carbonyl group, e. g. di-tertiary butyl ketone, or aryl alkyl ketones, where the alkyl radical has a tertiary carbon atom adjacent to the carbonyl group, may be employed since such ketones, which have no hydrogen atom on the carbon atom adjacent to the carbonyl group will form addition compounds with alkali metals without hydrogen evolution.

In practicing our invention we prefer to use a solvent medium in which the sodium addition compound can be formed and in which this compound is more or less soluble. We may react the alkali metal to form the addition compound in this solvent and simultaneously cause the addition compound to react with sulphur dioxide or an alkyl sulphite whereby sodium hydrosulphite is produced, usually as a precipitate. The precipitate is removed from the reaction mixture, e. g. by filtration and is purified by known means. Our product is similar to the product obtained by prior methods in that it is in amorphous form. To transform the product into the more stable crystalline product stages, methods already known in this art may be utilized, e. g., the product may be dissolved in water and precipitated from the water solution by adding alcohol thereto and finally dehydrating by washing with absolute alcohol.

In one method of practicing our invention, which is described by way of example, a suitable organic compound, e. g., a polycyclic aromatic hydrocarbon such as naphthalene or an aromatic ketone such as benzophenone is dissolved in a suitable solvent and reacted with metallic sodium to form the addition compound. As soon as the reaction between the alkali metal and the organic compounds commences as evidenced by a coloration of the solution, a stream of sulphur dioxide gas is bubbled through the reaction mixture, preferably with continuous agitation. As the solution is contacted with the sulphur dioxide, the mixture is decolorized because of the reaction between the sulphur dioxide and the alkali metal addition compound. The sulphur dioxide during the course of the process is passed in at such rate that the decolorization is at all times incomplete. That is, the maximum rate of sulphur dioxide introduction is such that the characteristic color appears at least on the surfaces of the particles of the sodium in the reaction mixture or in close proximity to the surfaces. If the rate of sulphur dioxide addition is too rapid, the surface of the sodium will be observed to take on a white color after which the sodium will no longer take part in the reaction. From time to time, fresh quantities of sodium may be added to the reaction mixture to replace the sodium reacted, if desired. As the reaction continues, the sodium hydrosulphite precipitates and, unless some means is provided for continuously removing the hydrosulphite formed, the reaction is terminated when the precipitate makes agitation of the reaction mixture difficult.

If the alkali metal addition compound utilized in practicing our invention is to be made from a polycyclic hydrocarbon, e. g., naphthalene, diphenyl and the like, the method to be followed will vary somewhat depending upon the alkali metal used. In using such hydrocarbons, we prefer to utilize the method described and claimed in the co-pending applications by N. D. Scott, Serial Numbers 638,524; 678,261 and 691,574, now Patents 2,027,000, 2,023,793, and 2,019,832, for the preparation of the addition compound. In accordance with this method, the alkali metal and the hydrocarbon are caused to react in solvent media comprising certain types of ethers in which the reaction occurs readily, whereas in other ethers as solvents, so far as is now known, this reaction occurs not at all or with extreme slowness. Suitable ethers as solvents for forming the alkali metal addition compounds of the aromatic polycyclic hydrocarbons and utilizing the addition compounds in the present invention are, as disclosed by the above mentioned copending applications, certain mono ethers, e. g., dimethyl ether, methyl ethyl ether, aliphatic diethers such as dimethyl glycol ether, diethyl glycol ether and methylal; other polyethers such as fully alkylated glycerols and cyclic ethers such as dioxan and glycol formal.

In accordance with the method of the above mentioned Scott applications, a polycyclic aromatic hydrocarbon, e. g. naphthalene, diphenyl, anthracene or acenaphthene, is dissolved in one of the above mentioned solvent ethers and sodium or other alkali metal is reacted therewith under substantially anhydrous conditions. Preferably, the reaction is carried out in a closed vessel, from which air has been displaced by an inert gas, e. g. nitrogen, and with vigorous agitation. The reaction proceeds readily at room temperature, as well as at higher or lower temperatures; in general, temperatures of from —80° C. to 100° C. may be employed, as desired. It is essential that the surface of the metallic alkali metal reacted be clean, in order to start the reaction. If the reaction fails to proceed at once, it usually can be started by scraping the surface of one or more of the pieces of metal in the mixture. The reaction proceeds until the amount of alkali metal reacted is equivalent to one molecule of hydrocarbon for each atomic proportion of metal reacted. Since the green addition compound formed reacts with water without hydrogen evolution to form the dihydro derivative of the hydrocarbon, or with carbon dioxide to form the dicarboxy derivative, it is believed that the addition compound may be a di-metal derivative of the hydrocarbon. Thus, sodium reacts with naphthalene to form disodium naphthalene ($C_{10}H_8Na_2$). The colored solutions of the alkali metal addition compounds of the polycyclic aromatic hydrocarbons made by this method are suitable for practicing our herein described invention.

Another method of utilizing our invention consists in first forming an alkyl alkali metal sulphite in a suitable solvent, and reacting the sulphite with one of the above mentioned alkali metal addition compounds. In our preferred method of practicing this modification of the invention, we first prepare a solution of an alkali metal alcoholate by reacting a suitable aliphatic alcohol with an alkali metal, e. g., sodium, and suspending or dissolving the alcoholate in the ether solvent to be used in the final reduction reaction. The alcoholate then is reacted with sufficient sulphur dioxide to convert it to the alkyl alkali metal sulphite, preferably by reacting one mole of sulphur dioxide with each molar equivalent of the alcoholate. The resulting alkyl alkali metal sulphite solution then is reacted with a solution of one of the above described alkali metal addition compounds to which small pieces of metallic sodium have been added. Sulphur dioxide then is passed in at a controlled rate and more sodium is added as required until a sufficient quantity of the hydrosulphite has been formed. Preferably in carrying out the reaction we alternately add small quantities of sodium and small quantities of sulphur dioxide until the operation is completed. In this procedure, as in the procedure described above, the rate of sulphur dioxide addition is so controlled that the characteristic color of the metallic addition compound is never completely discharged.

In this method we prefer to make certain that all of the alcohol has been converted to the alcoholate before passing in sulphur dioxide to form the alkyl alkali metal sulphite. We have found that ordinarily it is difficult to obtain complete reaction between the alcohol and alkali metal in preparing the alcoholate solution, especially if the alcohol has a relatively high molecular weight. In such cases we find it advantageous to treat the alcoholate solution containing a small amount of unreacted alcohol with a small amount of a solution of one of the aforementioned alkali metal addition compounds, whereby all of the remaining alcohol is readily converted to the alcoholate. As an example of this procedure, we may first add a quantity of finely divided metallic sodium to the alcohol or a solution thereof and agitate the mixture until the reaction is approximately complete. The solution then is separated from the unreacted metal, e. g., by filtration or decantation, and to the solution we then add sufficient of the alkali metal addition compound solution until the color of the addition compound persists in the solution. Alkali metal, in small pieces then is added to the colored solution and sulphur dioxide is passed in, as described above.

Various alcohols may be utilized to prepare alkyl sulphites for practicing our invention as described in the preceding paragraph. In general those alcohols which are suitable for preparing hydrosulphite by alkyl sulphite reduction by prior methods are likewise suitable for our herein described method. We have used, for example, such alcohols as methanol, ethanol, mono methyl ether of ethylene glycol and the mono ethyl ether of ethylene glycol.

The solvent to be used in practicing our invention for reducing sulphite must be one in which the alkali metal addition compound utilized is soluble and which is substantially inert to metallic sodium and to the said addition compound. The solvent, of course, should be substantially anhydrous for the best results, since the presence of water is deleterious in the reaction. If the alkali metal addition compound is the sodium compound of an aromatic polycyclic hydrocarbon, the solvent should be one of the ether solvents in which such compounds may be prepared and dissolved. Various other ethers and other suitable organic solvents, e. g., hydrocarbons, may be used when anthraquinone, benzophenone or other suitable carbonyl compounds are used to prepare the alkali metal addition compound utilized. While all of these various solvents are suitable for practicing our invention, we have found that with some solvents the yield of hydrosulphite is greater than with others. Generally, the best yields are obtained with an ether as solvent and we have discovered that dimethyl ether is more satisfactory for producing high yields of hydrosulphite than any other solvent which we have tested. One reason for this appears to be that whereas certain other ethers, especially those having a relatively high molecular weight, tend to take part in side reactions, the dimethyl ether is relatively highly stable and remains substantially unreacted throughout the course of the operation.

While the operating temperature used in practicing our invention may be varied over wide limits we have found that the best results are obtained by using low temperatures. Preferably we operate at temperatures below 0° C. and have found that in general, best results are secured by operating in the range of −10 to −60° C. Also the optimum operating temperature will depend to some extent upon the solvent used, one reason for this being that some solvents may become rather viscous at extremely low temperatures and a high viscosity of the reaction mixture generally is undesirable. For example, in operating with relatively high molecular weight solvents such as dimethyl glycol ether, we prefer to operate within the range of about 0° to −20° C., e. g., around −10° C. On the other hand with a low molecular weight solvent such as dimethyl ether, we prefer to operate at temperatures in the range of −40 to −60° C.

A method of preparing an alkali metal addition compound of a polycyclic aromatic hydrocarbon is illustrated by the following example:—

*Example 1*

100 cc. of dimethyl glycol ether at approximately 10° C. is placed in a flask and to this is added 19 grams of flake naphthalene and then 5.6 grams of clean sodium, cut in small slices. The reaction commences immediately on the addition of the sodium as evidenced by the formation of a green color. The mixture then is agitated under an atmosphere of nitrogen for about 2 hours, at which time the reaction is complete.

*Example 2*

The following procedure is illustrated by Fig. 1 of the appended drawings. Monomethyl glycol ether is dissolved in about 200 parts of dimethyl glycol ether in reaction vessel "A" and an excess of metallic sodium in a finely divided form over that required to react with the alcohol is added to the solution. The mixture is continuously agitated and boiled under a reflux condenser for about one hour, to form the alcoholate of the monomethyl glycol ether. The solution then is decanted from the unreacted sodium and placed in a closed reaction vessel "C" equipped with a stirring device. The air above the solution is replaced with oxygen-free nitrogen and a solution of sodium naphthalene addition product in dimethyl glycol ether, prepared in reaction vessel "B" as described in Example 1, is added to the alcoholate solution in reaction vessel "C" until a pale green color persists. Sulphur dioxide then is passed into the reaction mixture in an amount equal to about one molar equivalent of the alcoholate. The temperature of the solution then is reduced to about 10° C. and maintained at this temperature throughout the subsequent operation. A small amount of sodium is now added and after a short time a small amount of sulphur dioxide is passed in; and the alternate addition of sodium and sulphur dioxide are continued at a regular rate, with continuous agitation. The rate of sulphur dioxide addition is at all times controlled during this stage of the process so that the green color is never completely discharged. When sufficient hydrosulphite has precipitated, the agitation and additions of sodium and sulphur dioxide are discontinued and the finely divided suspended precipitate is separated by centrifuging. This precipitate then is washed with alcohol and dried in the usual manner. The liquid separated in the centrifuging operation may be discarded or may be subjected to suitable operations to recover the glycol ethers.

*Example 3*

The following procedure is illustrated by Fig. 2 of the appended drawings. About 10 grams of benzophenone is placed in a closed reaction vessel which is equipped with a mechanical agitator. The air in the reaction vessel is displaced by nitrogen and by means of a suitable refrigeration the temperature of the contents of the reaction vessel is reduced to about −60° C. About 300 cc. of liquid dimethyl ether then is added by condensing dimethyl ether vapor in the reaction vessel and the temperature then is increased to and maintained thereafter at about −50° C. Four grams of sodium cut in small sticks then is added to the reaction mixture and the mixture agitated until the color due to the formation of the sodium addition compound has become distinctly blue, which requires about one minute. Then sulphur dioxide is continuously introduced into the reaction mixture with continuous agitation. The rate of sulphur dioxide addition is so adjusted that the bulk of the solution remains white or colorless while a blue color remains on and adjacent to the surfaces of the sodium strips. As the reaction proceeds, more sodium is added in batches of two to three grams as required to maintain the reaction. When most of the sodium has reacted after a total of about 18 grams has been added, unreacted sodium is separated from the resulting suspension of precipitated sodium hydrosulphite in the solvent and the suspension is made slightly alkaline by the addition of an alcoholic sodium hydroxide solution. Sufficient water to dissolve the hydrosulphite then is added to the mixture, which is then heated in a still to drive off the solvent. The vapors leaving the still are condensed and the first portion of the condensate, which is chiefly dimethyl ether, may be utilized in a succeeding operation. The hydrosulphite solution then is mixed with 250 cc. of anhydrous methanol in a crystallizing vessel and the mixture is heated to about 60° C., whereupon crystalline hydrosulphite precipitates out. The crystals are recovered by filtering and are washed with anhydrous methanol. The yield by this method from 15 grams of sodium is 45 to 46 grams of hydrosulphite which is 95% pure.

We claim:

1. A process comprising reacting an alkali metal with a solution of an organic compound selected from the group consisting of polycyclic aromatic hydrocarbons, diaryl ketones, anthraquinone, esters of aromatic acids, aryl alkyl ketones having a tertiary carbon atom adjacent to the carbonyl group, dialkyl ketones having two tertiary carbon atoms adjacent to the carbonyl group and alkyl derivatives of these compounds to form an alkali metal addition compound and simultaneously reacting said addition compound as formed with a compound selected from the group consisting of sulphur dioxide and alkyl alkali metal sulphites.

2. A process comprising reacting an ether solution of a polycyclic aromatic hydrocarbon with sodium to form a sodium addition compound of said hydrocarbon and simultaneously reacting said addition compound as formed with sulphur dioxide.

3. A process comprising reacting an ether solution of naphthalene with sodium to form a sodium addition compound of naphthalene and simultaneously reacting said addition compound as formed with sulphur dioxide.

4. A process comprising reacting an ether solution of diphenyl with sodium to form a sodium addition compound and simultaneously reacting said addition compound as formed with sulphur dioxide.

5. A process comprising reacting sodium with a solution of an aromatic carbonyl compound in which any carbon atom adjacent to the carbonyl group has no hydrogen atom attached thereto, to form a sodium addition compound and simultaneously reacting said addition compound as formed with sulphur dioxide.

6. A process comprising reacting a dimethyl ether solution of benzophenone with sodium to form a sodium addition compound and simultaneously reacting said addition compound as formed with sulphur dioxide.

7. A process comprising reacting a dimethyl ether solution of benzophenone with sodium to form a sodium addition compound and simultaneously reacting said addition compound as formed with sulphur dioxide at a temperature of −40 to −60° C.

8. A process for preparing an alkali metal hydrosulphite comprising reacting a compound selected from the group consisting of sulphur dioxide and the alkyl alkali sulphites with a sodium addition compound of a polycyclic aromatic hydrocarbon.

9. A process for preparing an alkali metal hydrosulphite comprising reacting a compound selected from the group consisting of sulphur dioxide and the alkyl alkali metal sulphites with the sodium addition compound of benzophenone.

10. The process comprising reacting sulphur compounds selected from the group consisting of sulphur dioxide and the alkyl alkali metal sulphites with an alkali metal addition compound of an organic compound selected from the group consisting of polycyclic aromatic hydrocarbons, diaryl ketones, anthraquinone, esters of aromatic acids, aryl alkyl ketones having a tertiary carbon atom adjacent to the carbonyl group, dialkyl ketones having two tertiary carbon atoms adjacent to the carbonyl group and alkyl derivatives of these compounds.

11. A process for producing an alkali metal hydrosulphite comprising adding an alkali metal and a sulphur compound selected from the group consisting of sulphur dioxide and the alkyl alkali metal sulphites to a solution of an alkali metal addition compound of an organic compound selected from the group consisting of polycyclic aromatic hydrocarbons, diaryl ketones, anthraquinone, esters of aromatic acids, aryl alkyl ketones having a tertiary carbon atom adjacent to the carbonyl group, dialkyl ketones having two tertiary carbon atoms adjacent to the carbonyl group and alkyl derivatives of these compounds.

12. A process for producing an alkali metal hydrosulphite comprising reacting a sulphur compound selected from the group consisting of sulphur dioxide and the alkyl alkali metal sulphites with an alkali metal addition compound of a polycyclic aromatic hydrocarbon.

13. A process for producing an alkali metal hydrosulphite comprising reacting a sulphur compound selected from the group consisting of sulphur dioxide and the alkyl alkali metal sulphites with an alkali metal addition compound of a diaryl ketone.

14. A process for producing an alkali metal hydrosulphite comprising adding an alkali metal and sulphur dioxide to a solution containing an alkali metal addition derivative of a diaryl ketone.

15. A process for making an alkali metal hydrosulphite comprising reacting a sulphur compound selected from the group consisting of sulphur dioxide and the alkyl alkali metal sulphites with an alkali metal addition compound of benzophenone.

16. A process for producing sodium hydrosulphite comprising adding sodium and sulphur dioxide to a solution containing the sodium addition compound of benzophenone.

NORMAN D. SCOTT.
JOSEPH FREDERIC WALKER.
VIRGIL L. HANSLEY.